UNITED STATES PATENT OFFICE.

HERBERT W. KUGLER, OF AKRON, OHIO, ASSIGNOR TO THE FIRESTONE TIRE & RUBBER COMPANY, OF AKRON, OHIO, A CORPORATION OF OHIO.

PROCESS OF RECLAIMING RUBBER.

1,124,920. Specification of Letters Patent. Patented Jan. 12, 1915.

No Drawing. Application filed December 20, 1912. Serial No. 737,819.

*To all whom it may concern:*

Be it known that I, HERBERT W. KUGLER, a citizen of the United States, residing at Akron, Summit county, State of Ohio, have invented certain new and useful Improvements in Processes of Reclaiming Rubber, of which the following is a specification.

My invention relates to reclaiming waste vulcanized rubber and has for its principal object obtaining rubber from such waste in such a manner as to restore it largely to its original unvulcanized condition. Incidentally, my process is usually accompanied by the elimination of other ingredients of the waste, such as fibers.

A large commercial use for my process is found in the reclaiming of waste rubber containing a percentage of fabric, sulfur, and inert ingredients,—for example, worn vehicle tires.

The sulfur in vulcanized rubber exists in both the free and combined states. The usual treatment of waste rubber, while adequate for the removal of fabric, removes only a portion of the free sulfur and does not remove any of the combined sulfur. It actually increases the amount of combined sulfur because at the temperatures usually employed a portion or all of the uncombined sulfur may go into combination with the rubber.

The so-called reclaimed rubbers of commerce consist of a mass of more or less finely divided particles of vulcanized rubber which cohere by reason of the softening effect of heat, or due to the presence of oils or other ingredients in the mass.

As distinguished from the generally used methods my improved process contemplates the elimination of not only free sulfur but also a considerable proportion of combined sulfur from the rubber, with the result that my product is substantially in the condition of the rubber or rubber compound before vulcanization.

The differences between the result of my process and the products of the prior art may be shown by the application of a simple test. Thus, if any of the so-called reclaimed rubbers of commerce produced by the usual methods is treated with a rubber solvent without the application of heat or pressure, it swells to several times its original volume by absorption of the solvent, loses its cohesive character, and becomes a friable mass. As contrasted with this, the reclaimed rubber produced by my process, when treated in a like manner with a rubber solvent, forms a true and complete solution that cannot be distinguished from a solution made from a similar unvulcanized rubber compound.

In carrying out my process I make simultaneously use of an adjuvant agent, preferably a member of the carbocyclic amido compounds, say anilin, toluidin or xylidin, and a substance capable of absorbing or combining with sulfur as for example the hydrates of the alkali metals. By the term adjuvant agent I mean a substance the presence of which permits the reaction to take place but which itself at the end of the reaction is unaltered, such agent heretofore having been frequently characterized as a catalyzer or catalytic agent. The proportion of the adjuvant agent used will vary with the nature of the scrap. The usual proportions which I have successfully employed are from 2 to 5 per centum in weight of anilin. The amount of the substance capable of absorbing or combining with sulfur is determined primarily by the amount of sulfur in the scrap used and is also dependent upon whether it is used for the additional purpose of removing fabric or other ingredients from the rubber.

The scrap to be reclaimed is first ground or otherwise reduced to as fine a condition as practicable and then placed in a heater or digester together with the adjuvant agent and the sulfur absorbing substance and the requisite amount of water to insure the even distribution of the different materials throughout the mass. The heater is then closed and the temperature raised to correspond to a steam pressure of from 60 to 150 pounds, although in practice a temperature corresponding to 100 pounds steam pressure will be found most suitable for the average run of scrap. This temperature is maintained for a period of say eight hours, or for a shorter or longer period, depending upon the nature of the scrap, the character and quantity of the adjuvant agent, temperature, pressure and the physical condition of the finished product it is desired to obtain. At the end of the treatment the heater or digester is emptied and the rubber washed with water until free from water soluble substances. It can then be dried and sheeted by any of the well known methods.

Vulcanized rubber has certain physical characteristics which render its reclamation necessary before it can be used industrially to any extent in lieu of crude rubber. It is impossible to reduce the rubber to a plastic mass by mechanical agitation so that it can be formed into different shapes and have incorporated with it fabric, sulfur, and other materials and be vulcanized into new articles. Another characteristic of vulcanized rubber as explained in a previous paragraph is its inability to form true solutions with a rubber solvent and so as to give rubber cements.

When vulcanized rubber is subjected to treatment according to my process the resultant product is capable of being reduced to a plastic mass that can be worked into sheets and other forms and on mixing with sulfur and other ingredients can be vulcanized and handled like new rubber. It will also give with rubber solvents true solutions such as those made from similar compounds that have not been subjected to vulcanization.

The chemical reactions that take place during the operation of my process cannot be definitely or entirely stated but appear to come under the head of those heretofore commonly known as catalytic reactions, the amido substance acting as an adjuvant agent to carry the sulfur from the rubber to the sulfur absorbing substance present. In the claims I have stated this action but I desire it to be understood that such statement is intended to be descriptive rather than definitive.

I am aware that it has been heretofore proposed to use substances of the amido group (specifically anilin, toluidin or xylidin), for the reclaiming of vulcanized rubber but in a different way and with a different object in view. For example, it has been proposed to use an amido substance as a solvent for vulcanized rubber. In such processes a large amount of the amido substance, many times the weight of the scrap, is used, and the mixture is heated until the rubber is depolymerized to such an extent that the depolymerized products dissolve in the amido substance. These depolymerized products are no longer rubber. It is then treated with a substance capable of throwing the rubber out of solution, such as an alcohol or an acid. This process does not effect the elimination of sulfur but rather increases the amount of combined sulfur, as heretofore stated, and the so-called reclaimed rubber produced by it resembles that produced by subjecting vulcanized rubber to high temperatures or to the action of other solvents at high temperatures. It has also been proposed to heat vulcanized rubber with much smaller amounts of an amido substance, say 10 to 20 per centum, with the object of effecting a chemical combination between the rubber and the amido substance and thus produce a new compound to be used to replace crude rubber. This compound contains all the sulfur that originally existed in the free and combined states in the vulcanized rubber used.

My process is distinguished from those above outlined and from all others known to me, by the important fact that I use the amido substance in small proportions and in conjunction with a substance capable of absorbing or combining with sulfur and obtain thereby a product that is substantially the same as the unvulcanized compound from which the vulcanized rubber was made. That is to say, my product is not a compound of the amido substance and rubber, nor is it the result of solution in the amido compound, nor does it contain any new or different ingredient than was in the original rubber compound, while the whole of the free sulfur, and to a great extent the combined sulfur, has been eliminated.

I claim:

1. The process of reclaiming rubber which consists in simultaneously treating vulcanized rubber under suitable conditions of temperature and pressure with an agent such as anilin, toluidin, xylidin or the like and a substance capable of combining with or absorbing sulfur, substantially as described.

2. The process of reclaiming rubber, which consists in simultaneously treating vulcanized rubber under suitable conditions of temperature and pressure with an adjuvant agent and a substance capable of combining with or absorbing sulfur, substantially as described.

3. The process of reclaiming rubber, which consists in simultaneously treating vulcanized rubber under suitable conditions of temperature and pressure with a carbocyclic amido compound such as anilin, toluidin, xylidin, or the like, and a caustic alkali solution, substantially as described.

4. The process of reclaiming rubber, which consists in simultaneously treating vulcanized rubber under suitable conditions of temperature and pressure with a carbocyclic amido compound such as anilin, toluidin, xylidin, or the like, and a caustic alkali solution, and washing the rubber, substantially as described.

5. The process of reclaiming vulcanized rubber which consists in simultaneously treating the material in a finely divided condition and under heat and pressure with an adjuvant agent and a substance capable of combining with or absorbing sulfur.

6. The process of reclaiming rubber which consists in simultaneously treating vulcanized rubber under suitable conditions of temperature and pressure with an adjuvant agent and a substance capable of combining with or absorbing combined sulfur of the vulcanized rubber only in the presence of an adjuvant agent, substantially as described.

7. The process of reclaiming rubber which consists in simultaneously treating vulcanized rubber containing textile fabric under suitable conditions of temperature and pressure with a substance capable of destroying the fabric, and an adjuvant agent the presence of which causes such substance to also combine with or absorb combined sulfur of the vulcanized rubber, substantially as described.

8. The process of reclaiming vulcanized rubber containing textile fabric which consists in simultaneously treating the material in a finely divided condition under suitable conditions of temperature and pressure with a substance capable of destroying the fabric, and an adjuvant agent the presence of which causes such substance to combine with or absorb the combined sulfur of the vulcanized rubber, and mechanically separating the reclaimed rubber from the residue, substantially as described.

9. The process of reclaiming vulcanized rubber containing textile fabric which consists in simultaneously treating the material in a finely divided condition under suitable conditions of temperature and pressure with a caustic alkali solution capable of destroying the fabric, and a carbocyclic amido compound adjuvant agent the presence of which causes such caustic alkali to combine with or absorb combined sulfur of the vulcanized rubber, substantially as described.

10. The process of reclaiming vulcanized rubber containing textile fabric which consists in simultaneously destroying the fabric and treating the vulcanized rubber under suitable conditions of temperature and pressure with an adjuvant agent and a substance capable of combining with or absorbing combined sulfur of the vulcanized rubber only when in the presence of an adjuvant agent, substantially as described.

HERBERT W. KUGLER.

Witnesses:
MARY E. CAHOON,
R. D. LITTLE.